United States Patent [19]

Buote

[11] Patent Number: 4,978,846

[45] Date of Patent: Dec. 18, 1990

[54] ANGULAR POSITION MEASUREMENT APPARATUS

[75] Inventor: William J. Buote, Natick, Mass.

[73] Assignee: Zymark Corporation, Hopkinton, Mass.

[21] Appl. No.: 450,753

[22] Filed: Dec. 14, 1989

[51] Int. Cl.⁵ .............................................. G01D 5/34
[52] U.S. Cl. ............................... 250/231.13; 338/196
[58] Field of Search ...................... 250/231.13, 231.14; 338/119, 196; 341/13

[56] References Cited

U.S. PATENT DOCUMENTS 2,565,213  8/1951  Falkenstein .................... 250/231.13
3,234,655  2/1966  Skeels et al. .................... 250/231.13

Primary Examiner—David C. Nelms
Assistant Examiner—K. Shami
Attorney, Agent, or Firm—John E. Toupal; Harold G. Jarcho

[57] ABSTRACT

An angular position measurement system including a rotatable mechanism, a potentiometer coupled to the rotatable mechanism and adapted to produce a first output signal indicative of the angular position thereof; a graduated element retaining a plurality of annularly distributed graduations representing different angular positions of the rotatable mechanism, and a detector for producing second output signals in response to alignment thereof with any of the graduations. Also included is a drive for producing relative movement between the graduated element and the detector in response to rotation of the rotatable mechanism so as to render the second output signal indicative of an angular position of the rotatable mechanism and a comparator for comparing the angular positions indicated by the first and second output signals.

20 Claims, 1 Drawing Sheet

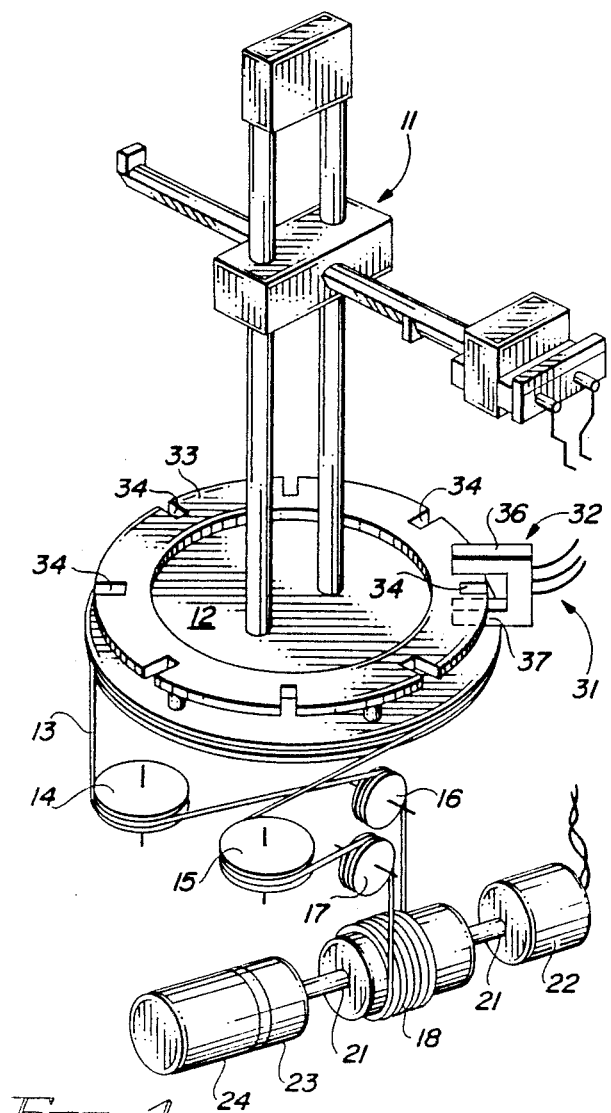
*Fig. 1*
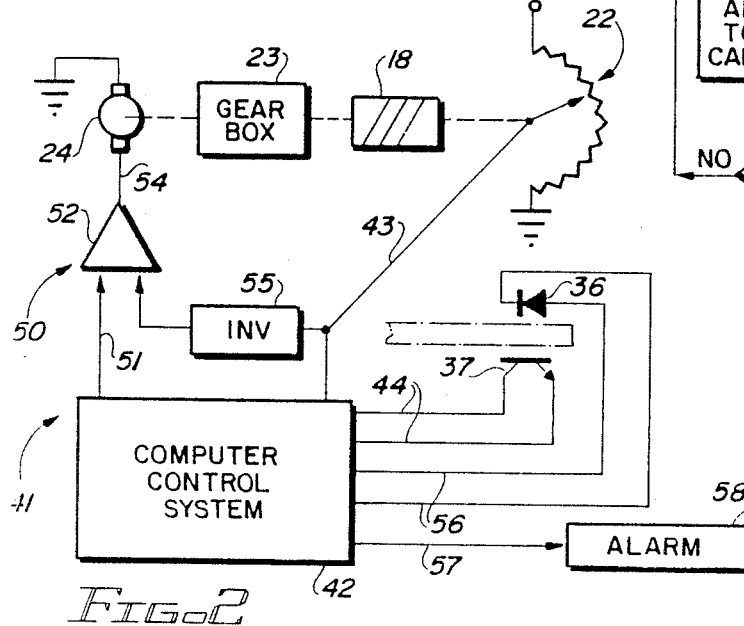
*Fig. 2*
| DISC POSITION | MEMORY BANK I (ORIGINALLY CALIBRATED VOLTAGES) | MEMORY BANK II (RECALIBRATED VOLTAGES) |
|---|---|---|
| 1 | 1.1 mv | 1.2 mv |
| 2 | 1.7 mv | 1.9 mv |
| 3 | 2.4 mv | 2.6 mv |
| 4 | 3.1 mv | 3.4 mv |
| — | — mv | — mv |
| — | — mv | — mv |
| X | Y mv | Z mv |
*Fig. 3*
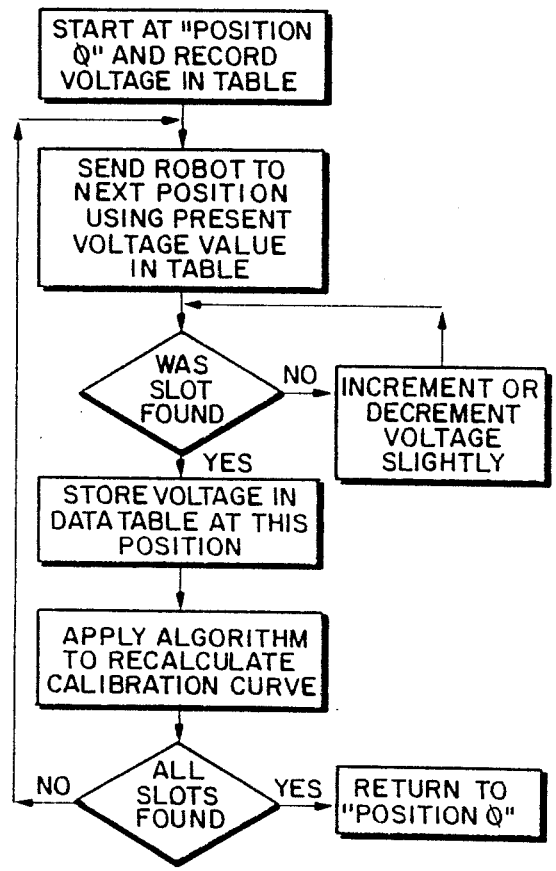
*Fig. 4*

ANGULAR POSITION MEASUREMENT APPARATUS

BACKGROUND OF THE INVENTION

This invention relates generally to angular position measurement apparatus and, more particularly, to a system for automatically calibrating a potentiometer controlled angular position control device.

A well known angular position control mechanism employs signals obtained from potentiometers as position-sensing means. In a typical system a turntable base is driven by a cable means attached to a winch and a potentiometer is coupled to the winch. The potentiometer senses the angular position of the winch(and thus the turntable position), and produces a signal that is fed into a control device, servomechanism that controls angular position of the turntable.

A potentiometer sensing arrangement is inexpensive to produce, engineer, manufacture and maintain because of readily available, low-cost potentiometers and conventional signal processing schemes. A drawback of this arrangement, however, stems from an inherent characteristic of potentiometers. As the system is used, the potentiometers wear physically and the signal output from them deviates from an original, factory signal output. This wear leads to drift in the rotary positioning of the turntable and requires routine recalibration. An example of a potentiometer controlled system of this type is disclosed in U.S. Pat. No. 4,507,044.

Other known systems employ optical encoders to measure and control angular position. For instance, an encoder disc having slots cut into its rim at predetermined intervals may be mounted on a turntable base and used to control rotary motion thereof. Each slot represents a unique turntable rotary position. An optical encoder aimed at the edge of the disc may be used to detect these slots. In the simplest incarnation of a device of this type, a software counter can merely count the number of slots on the position disc detected by the optical encoder as a drive motor moves the turntable through its rotary movement. If the turntable starts its movement at a known "home" position, the software counter may be set to zero and the number of counts obtained by the counter will thus be indicative of the angular position of the turntable. An example of an optical encoder controlled system is disclosed in U.S. Pat. No. 2,944,157.

Optical encoder systems, however, also have limitations. To sense position at a high degree of accuracy, the slots cut into the disc must be placed very close together. This is so because the number of rotary positions the system can detect is exactly equal to the number of slots, or "indices", on the position disc. In addition, the number of possible slots on the disc is physically restricted to a finite number, limiting the positional resolution of the system.

The above described limitations of optical encoder systems can be overcome to a degree by using more than one locating disc on the turntable. For example, an assembly of concentric discs (each having a plurality of graduated slots located at the periphery) can be mounted in a stacked fashion on the turntable base. Each disc has an optical encoder aimed at the edge to detect its slots. By varying such details as the arrangement of the slots on each disc and the number of discs used, a unique and less finite arrangement of index readings from all encoders reporting to the controlling device can be created. The result is that when the turntable is commanded to travel to a particular location, it will be sent to a locating disc "address" which is based on the combination of zeros and ones read from the optical encoders aimed at each locating disc.

Although arrangements of this type have benefits because of the use of the accurate optical encoders, they are expensive to manufacture because of the use of the encoders. Also, the controlled turntable using multiple locating discs requires more engineering and material and is thus also expensive to manufacture.

The object of this invention, therefore, is to provide an improved angular position measurement and control apparatus.

SUMMARY OF THE INVENTION

The invention is an angular position measurement system including a rotatable mechanism, a potentiometer coupled to the rotatable mechanism and adapted to produce a first output signal indicative of the angular position thereof; a graduated element retaining a plurality of annularly distributed gradations representing different angular positions of the rotatable mechanism, and a detector for producing second output signals in response to alignment thereof with any of the gradations. Also included is a drive for producing relative movement between the graduated element and the detector in response to rotation of the rotatable mechanism so as to render the second output signal indicative of an angular position of the rotatable mechanism and a comparator for comparing the angular positions indicated by the first and second output signals. In this system the angular position indicated by the potentiometer can be checked against the position indicated by the graduated element.

According to one feature of the invention, the comparator comprises a computer retaining in memory specific values of the first output signal, each value indicative of a different angular position of the rotatable mechanism; and the computer in response to the appearance of a second output signal produced by alignment of the detector and one of the graduations compares the angular position indicated thereby with the angular position indicated in memory by the simultaneously generated first output signal value. In this way the output of the potentiometer is compared with the extremely accurate angular positions represented by each gradation.

According to another feature of the invention, the computer is adapted to recalibrate the stored first output signal values so as to provide correspondence between the angular positions simultaneously indicated by the first and second output signals during each alignment between the detector and one of the graduations. Automatic recalibration of the system is obtained in this manner.

According to yet another feature of the invention, the computer is further adapted to provide an alarm signal in response to a given level of change in the values of the first output signal required to establish correspondence between the angular positions indicated by the first and second output signals. The alarm signal provides an indication of excessive potentiometer wear.

According to still further features of the invention, the detector comprises source means disposed on one side of the graduated element and adapted to direct a beam of radiation thereon and a radiation detector disposed on an opposite side of the graduated element and adapted to produce the second output signals in response to reception of the beam of radiation; and wherein said graduations comprises distinct segments of said disc means transparent to the beam of radiation. This arrangement produces accurate measurement of angular position of the rotatable mechanism.

According to an additional feature of the invention, the potentiometer is part of a servo system for controlling the angular position of the rotatable mechanism. Accurate, low cost angular position control is provided by this arrangement.

The invention further encompasses a method of measuring angular position of a rotatable shaft comprising the steps of coupling a potentiometer to the shaft so as to provide a first output signal indicative of the angular position thereof, providing a graduated element retaining a plurality of annularly distributed gradations representing different angular positions of the shaft, and locating with respect to the graduated element a detector adapted to produce a second output signal in response to alignment with any of the gradations. Additional steps include producing relative movement between the graduated element and the detector in response to rotational movement of the shaft so as to render the second output signal indicative of the angular position of the shaft and comparing the angular positions of the shaft indicated by the first and second signals. This method allows corrective comparison of angular positions represented by the first and second signals.

DESCRIPTION OF THE DRAWINGS

These and other objects and features of the invention will become more apparent upon a perusal of the following description taken in conjunction with the accompanying drawings wherein:

FIG. 1 is a perspective view of a robot controlled in accordance with the present invention;

FIG. 2 is a schematic block circuit diagram of a system for controlling angular position of the robot shown in FIG. 1;

FIG. 3 is a table illustrating data stored in memory of the computer control system shown in FIG. 2; and FIG. 4 is a schematic diagram of recalibration functions performed by the computer control system of FIG. 2.

DESCRIPTION OF THE PREFERRED EMBODIMENT

A robot 11 is mounted on a turntable 12 the selective rotation of which controls its angular position. Rotation of the turntable 12 is produced by a cable 13 guided by pulleys 14–17 and having ends secured to a winch 18. A desired tension is retained on the cable 13 by biasing means (not shown) coupled to the turntable 12. In response to the rotation of the winch 18, one end of the cable 13 is pulled while the other end is fed out to thereby induce rotation of the turntable 12 and the supported robot 11. The winch 18 is connected, on a common shaft 21, to a multi-turn potentiometer 22, and a gear box 23 of a motor 24. A more detailed description of the robot 11 and turntable 12 appears in above noted U.S. Pat. No. 4,507,044.

An optical encoder 31 measures the angular position of the turntable 12 and corresponding angular positions of the robot 11, the winch 18, the shaft 21 and the potentiometer 22 that rotate simultaneously therewith. The optical encoder 31 includes an optical detector assembly 32 and a disc element 33 supported on the turntable 12 for rotation therewith. Formed on the circumference of the disc element 33 are a plurality of annularly distributed gradation formed by graduation slots 34. The optical detector 32 includes a radiation source such as a light source 36 disposed on one side of the disc 33 and a radiation detector such as a photo detector disposed on an opposite side thereof. Rotation of the turntable 12 produces rotation of the disc element 33 with respect to the fixed optical detector 32 thereby producing sequential alignment of the light source 36 and photo detector 37 with the individual graduated slots 34. Optical encoder systems of the type shown are well known in the art and a typical such system is disclosed, for example, in above noted U.S. Pat. No. 2,944,157.

Controlling rotational movement of the robot 11 is an electrical control system 41 shown in FIG. 2. Included in the electrical system 41 is a computer control system 42 including a central processing unit, power supplies and a random access memory (RAM) for data storage. The computer control system 42 receives on line 43 an output signal provided by the potentiometer 22 and thereby indicative of the angular position of the rotatable turntable 12. Also received by the computer control system 42 on line 44 is an output signal produced by the photo detector 37 in response to the reception of light from the light source 36. The second output signal on line 44 is produced only in response to alignment of the optical detector 32 with one of the graduation slots 34 and is therefore also indicative of predetermined angular positions of the rotatable turntable 33.

A control voltage output of the computer control system 42 on line 51 is applied to a servo system 50. Included in the servo system 50 is a comparator 52 that receives the output on line 51 and the output signal of the potentiometer 22 on line 43 after inversion in an inverter 55. The summed output of the comparator 52 is applied on line 54 as a drive voltage for the motor 24. Also provided on lines 56, 57, respectively, by the computer control system 42 is operating voltage for the light source 36 and an input signal to an alarm 58.

As illustrated in FIG. 3, the RAM section of the computer control system 42 retains in Memory Bank I a series of calibrated output voltages required by the motor 24 to produce rotation of the winch 18 and associated rotation of the turntable 12 into predetermined angular positions. The calibration is such that the potentiometer 22 produces at each angular position of the turntable 12 a voltage equal to that voltage required by the motor 24 to establish that position. In response to an appropriate command, the computer control system 42 produces on line 51 an output voltage from Memory Bank I (FIG. 3) required to move the turntable 12 into a predetermined angular position. For example, responsive to a command to move to angular position number 4 in the table of FIG. 3 which could be, for example, 15 degrees from some arbitrary initial position, the computer control system 42 produces an output line 51 3.1 millivolts that is applied to the comparator 52. Also received by the comparator 52 is an inverted feedback signal from the potentiometer 22. Thus, the servo system 50 functions in the conventional way to produce rotation of the turntable 12 into the predetermined position represented by the voltage output of the computer control system 42 on line 51.

Precise angular control of the turntable 12 by the servo system 50 can be lost over time, however, because of mechanical wear in the potentiometer 22. For example, after some period of use, the potentiometer 22 may provide on line 43 only 3.0 millivolts with the turntable 12 in position 4. Consequently, in seeking position 4 the comparator 52 would continue to provide output voltage on line 54 until the motor 24 drives the turntable 12 into a different angular position in which the output of the potentiometer 22 matches the 3.1 millivolt output of the computer control system 42 on line 51. To ensure against erratic performance caused by a defective potentiometer, the present invention utilizes the optical encoder system 31 to either verify the accuracy of the potentiometer output or to recalibrate the computer control system and thereby compensate for wear of the potentiometer 22.

To effect recalibration of the system 41, the turntable 12 is moved to the arbitrarily selected position 1 identified in FIG. 3. The voltage output of the potentiometer 22 at that position is then recorded in the recalibration Memory Bank II (FIG. 3) of the computer control system. Because of mechanical wear of the potentiometer 22, the newly recorded recalibration voltage, for example 1.2 millivolts, may differ from the original calibration voltage of, for example, 1.1 millivolts as indicated in FIG. 3. The computer control system 42 then performs automatically the recalibration steps identified in FIG. 5. Initially, there is applied to the motor 24 the voltage in the original calibration voltage Memory Bank I that corresponds to the angular position of the first graduation slot 34 on the encoder disc 33. In the example illustrated in FIG. 3, that position might correspond, for example, to the position 4. In that position, the computer system 42 looks for an output on line 44 from the photo detector 37 indicating that the desired angular position has been obtained. In the absence of an output from the photo detector 37, the computer 42 sequentially slightly increments or decrements the voltage applied to the motor 25 until an output from the photo detector 37 is obtained. Having accurately verified the attainment of the desired position 4 by the output of the photo detector 37, the computer system 42 records for that position the current output voltage of the potentiometer 22 in the recalibration voltage Memory Bank II. As indicated in FIG. 3, the recalibration voltage of 3.4 millivolts for position 4 may differ from the original calibrated voltage of 3.1 millivolts for that position because of potentiometer wear.

Next, the computer system 42 applies an algorithm to establish recalibration voltages of 1.9 millivolts and 2.6 millivolts for positions 2 and 3 which fall between the initial position 1 and the position 4 corresponding to the first encountered graduation slot 34. The above steps are sequentially performed at the angular positions of the turntable 12 identified by alignment of the optical detector 32 with each of the graduation slots 34 in the encoder disc 33. Upon completion of the process, the RAM of the computer control system 42 retains in Memory Bank II highly accurate recalibrated voltage values required by the motor 24 to establish all of the predetermined angular disc positions desired for operation of the robot 11. During subsequent recalibration procedures, the recalibration voltages in the recalibration Memory Bank II are replaced by newly obtained voltage values. It will be obvious that the described recalibration procedure can be used as well to obtain the original calibrated voltages of Memory Bank I.

Upon completion of each recalibration procedure, the computer system 42 compares the measured recalibration voltages with the original calibration voltages in Memory Bank I. In the event that the changes in the recalibration voltages exceed some predetermined threshold level, the computer system 42 produces an output on line 56 that activates the alarm 58 and indicates that the wear of the potentiometer 22 has exceeded acceptable limits. An election can then be made to replace the potentiometer 22.

Obviously, many modifications and variations of the present invention are possible in light of the above teachings. It is to be understood, therefore, that the invention can be practiced otherwise than as specifically described.

What is claimed is:

1. Angular position measurement apparatus comprising:
   rotatable means;
   potentiometer means coupled to said rotatable means and adapted to produce a first output signal indicative of the angular position thereof;
   element means retaining a plurality of annularly distributed gradations representing different angular positions of said rotatable means;
   detector means for producing second output signals in response to alignment thereof with any of said gradations;
   drive means for producing relative movement between said element means and said detector means in response to rotation of said rotatable means so as to render said second output signal indicative of an angular position of said rotatable means; and
   comparator means for comparing the angular positions indicated by said first and second output signals.

2. An apparatus according to claim 1 wherein said comparator means is adapted in response to alignment of said detector with one of said gradations to compare the given angular position indicated by the resultant second output signal with the predetermined angular position then indicated by said first output signal.

3. An apparatus according to claim 2 wherein said comparator comprises computer means retaining in memory specific values of said first output signal, each value indicative of a different angular position of said rotatable means; and said computer means in response to the appearance of a second output signal compares the angular position indicated thereby with the angular position indicated in said memory by the simultaneously generated first output signal value.

4. An apparatus according to claim 3 wherein said computer means is adapted to recalibrate said stored first output signal values so as to provide correspondence between the angular positions simultaneously indicated by said first and second output signals during each alignment between said detector means and one of said gradations.

5. An apparatus according to claim 4 wherein said computer means is further adapted to provide an alarm signal in response to a given level of change in the values of said first output signal required to establish correspondence between the angular positions indicated by said first and second output signals.

6. An apparatus according to claim 5 wherein said element means comprises disc means, said detector means comprises source means disposed on one side of said disc means and adapted to direct a beam of radiation thereon and a radiation detector means disposed on an opposite side of said disc means and adapted to produce said second output signals in response to reception of said beam of radiation; and wherein said gradations comprises distinct segments of said disc means transparent to said beam of radiation.

7. An apparatus according to claim 6 wherein said gradations comprises slots in said disc means.

8. An apparatus according to claim 1 including a servo system comprising motor means for inducing rotation of said rotatable means, voltage supply means for providing a control voltage representing a predetermined angular position of said rotatable means, comparison means for comparing said control voltage and said first output signal and producing therewith a drive voltage for application to said motor means.

9. An apparatus according to claim 8 wherein said comparator means is adapted in response to alignment of said detector with one of said gradations to compare the given angular position indicated by the resultant second output signal with the predetermined angular position then indicated by said first output signal.

10. An apparatus according to claim 9 wherein said comparator comprises computer means retaining in memory specific values of said first output signal, each value indicative of a different angular position of said rotatable means; and said computer means in response to the appearance of a second output signal compares the angular position indicated thereby with the angular position indicated in said memory by the simultaneously generated first output signal value.

11. An apparatus according to claim 10 wherein said computer means is adapted to recalibrate said stored first output signal values so as to provide correspondence between the angular positions simultaneously indicated by said first and second output signals during each alignment between said detector means and one of said gradations.

12. An apparatus according to claim 11 wherein said computer means is further adapted to provide an alarm signal in response to a given level of change in the values of said first output signal required to establish correspondence between the angular positions indicated by said first and second output signals.

13. An apparatus according to claim 12 wherein said detector means comprises source means disposed on one side of said disc means and adapted to direct a beam of radiation thereon and a radiation detector means disposed on an opposite side of said disc means and adapted to produce said second output signals in response to reception of said beam of radiation; and wherein said gradations comprises distinct segments of said disc means transparent to said beam of radiation.

14. An apparatus according to claim 13 wherein said gradations comprises slots in said disc means.

15. A method of measuring angular position of a rotatable shaft comprising the steps of:

coupling a potentiometer to said shaft so as to provide a first output signal indicative of the angular position thereof;

providing an element retaining a plurality of annularly distributed gradations, representing different angular positions of said shaft;

locating with respect to said element a detector adapted to produce a second output signal in response to alignment with any of said gradations;

producing relative movement between said element and said detector in response to rotational movement of said shaft so as to render said second output signal indicative of the angular position of said shaft; and comparing the angular positions of said shaft indicated by said first and second signals.

16. A method according to claim 15 wherein said comprising step comprises comparing the angular position of said shaft indicated by alignment between said detector and any of said gradations with the angular position then indicated by said first output signal.

17. A method according to claim 16 including the step of recording specific values of said first signal values each indicative of a different angular position of said shaft; and wherein said comparing step comprises comparing in response to the appearance of a second output signal the angular position of said shaft indicated thereby with the angular position indicated in said recorded values by the simultaneously generated first output signal.

18. A method according to claim 17 including the step of modifying said recorded specific values so as to provide correspondence between the angular positions of said shaft simultaneously indicated by said first and second signals during each alignment between said detector and one of said gradations.

19. A method according to claim 18 including the step of providing an alarm signal in response to a given level of change in the values of said first output signal required to establish correspondence between the angular positions of said shaft simultaneously indicated by said first and second output signals.

20. A method according to claim 19 including the steps of providing a control voltage representing a predetermined angular position of said shaft, producing a drive voltage dependent on the difference between said control voltage and said first output signal, and applying said drive voltage to a motor coupled to said shaft and adapted to produce rotation thereof.

* * * * *